United States Patent [19]

Cuscurida

[11] 4,435,527

[45] Mar. 6, 1984

[54] POLYESTER POLYMER POLYOLS MADE WITH POLYESTER POLYCARBONATES AND POLYURETHANES THEREFROM

[75] Inventor: Michael Cuscurida, Austin, Tex.

[73] Assignee: Texaco Inc., White Plains, N.Y.

[21] Appl. No.: 460,506

[22] Filed: Jan. 24, 1983

[51] Int. Cl.$^3$ .............................................. C08G 18/14
[52] U.S. Cl. .................................. 521/173; 260/463; 528/76; 528/77
[58] Field of Search ....................... 521/173; 260/463; 528/76, 77

[56] References Cited

U.S. PATENT DOCUMENTS 4,165,423 8/1979 Passagne et al. .................... 260/463
4,267,120 5/1981 Cuscurida et al. .................. 521/125

Primary Examiner—Maurice J. Welsh
Attorney, Agent, or Firm—Robert A. Kulason; Kenneth R. Priem; David L. Mossman

[57] ABSTRACT

A polyester polymer polyol made by the reaction of a polyester polycarbonate, a polyether polyol and an organic polyisocyanate is described. The polyester polycarbonate may have a molecular weight of about 250 to 1,000. The polyether polyol may have a molecular weight of about 3,000 to 8,000. This polyester polymer polyol may be used in the manufacture of flexible polyurethane foams which are characterized by good load bearing properties as well as good water absorption and retention properties. Foams made from these polymer polyols show a lesser tendency to yellow than those made from prior art polyols and polymer polyols.

6 Claims, No Drawings

POLYESTER POLYMER POLYOLS MADE WITH POLYESTER POLYCARBONATES AND POLYURETHANES THEREFROM

BACKGROUND OF THE INVENTION

1. Field of the Invention

The invention pertains to the field of polyurethane plastics and more particularly relates to polyurethane plastics made using novel polyester polymer polyols.

2. Description of Related Compositions

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2,000 to 3,000 and above. These polyols are then reacted with polyisocyanate in the presence of water or other blowing agents such as fluorocarbons to obtain polyurethane foams. Polyols have been modified in many ways in attempts to improve the properties of the resulting polyurethane.

For example, elastomeric polytetramethylene ether polyurethane polymers may be made from reactions involving a polytetramethylene ether glycol having a molecular weight of at least 750, an organic diisocyanate and a chain extender containing active hydrogen according to U.S. Pat. No. 2,929,800. The glycol may be added to the diisocyanate to form a prepolymer.

U.S. Pat. No. 3,294,751 relates to the preparation of polyurethanes via a modified polyol called a ureido-polyol. These low molecular weight ureido-polyols are formed by the reaction of an organic compound consisting of a hydrocarbon group having less than 10 carbon atoms and at least one isocyanate group and an alkanol-amine. Further, the invention disclosed in U.S. Pat. No. 4,118,376 concerns a hydrocurable composition suitable for use as coatings, adhesives or grouts. The composition contains oxazolidine compounds and free isocyanate groups containing prepolymers where the prepolymers are obtained by the reaction of polyisocyanates with special types of dispersions where the dispersed phase in synthesized in situ in a dispersing media of polyhydroxyl compounds.

Other prior art describes modified polyols in which vinyl monomers such as styrene or acrylonitrile or other materials such as hydrazine hydrate have been included to improve the properties of the polyols and thus, the properties of the resulting foam. However, some of these prior art materials are highly toxic and require, in addition, stripping of unreacted vinyl monomers or water of hydration.

German Offenlegungsschrift No. 2,110,055 discloses a process for making a polyurethane product whereby a hydroxyl-containing amine is included in the formulation in a one-shot process. That is, the hydroxyl-containing amine is simply included initially with the polyol and the polyisocyanate and a polyurethane product results. The German process does not use a polyurea polymer polyol which is then reacted with a polyisocyanate. Our invention makes improved polyurethane foams over the process of the German patent as will be made clear by the disclosure and the examples which follow.

A polymer-modified polyol may be formed by polymerizing an alkanolamine with an organic polyisocyanate in the presence of a polyol as taught by British Patent application No. 2,072,204A. The alkanolamine may react polyfunctionally with the polyisocyanate to produce polyaddition products which may constitute a stable dispersion in the polyol. The resulting modified polyol is stated to be particularly useful as a polyol starting material for reaction with a polyisocyanate in the manufacture of polyurethane foam.

Stable dispersions are also revealed in U.S. Pat. No. 4,089,835. Here, the stable dispersions comprise polyureas and/or polyhydrazo-dicarbonamides as the disperse phase in a hydroxyl group-containing material selected from the group of polyethers, polyesters, polyester amides and polycarbonates. These dispersions may be produced by reacting organic polyisocyanates with polyamines containing primary and/or secondary amino groups and/or hydrazines and/or hydrazides in the hydroxyl-containing material.

Similar polymer polyols prepared in the presence of water to reduce viscosity are taught as being useful in high resilience (HR) foams, according to U.S. Pat. No. 4,093,569. In this patent description, low viscosity dispersions are produced by reacting organic polyisocyanates with compounds having primary and/or secondary amino groups and/or primary hydroxyl groups in compounds having at least one hydroxyl group in the presence of more than 4% by weight of water.

An equilibrium product of two polyols, at least one of which is a polyester polyol, can be accomplished by heating the components at 230° C. in the presence of tetraisopropye titonate as a catalyst. This equilibrium product is taught by U.S. Pat. No. 3,666,724 as a copolymer which gives a better resulting foam.

Highly related is our own U.S. Pat. No. 4,296,213 which relates to polyurea polymer polyols made by the reaction of a hydroxyl-containing amine, a polyether polyol of about 3,000 to 8,000 molecular weight and an organic polyisocyanate. The hydroxyl-containing amines contemplated therein are described as ranging in molecular weight from about 60 to 200, preferably from about 60 to about 150. It was not realized that higher molecular weight, hydroxylcontaining amines, which also contain aromatic groups, would also give a polymer polyol which would impart enhanced properties to flexible urethane foams.

SUMMARY OF THE INVENTION

The invention concerns a polyester polymer polyol made by the reaction of a polyester polycarbonate, a polyether polyol and an organic polyisocyanate where the combined portion of polyester polycarbonate and polyisocyanate is 10 to 40 wt. % of the polyether polyol portion, and the ratio of equivalents of polyester groups to equivalents of isocyanate groups ranges from 0.5 to 2.0, and polyurethanes made therefrom.

DESCRIPTION OF THE PREFERRED EMBODIMENTS

The polyester polymer polyols of this invention are made by the reaction of a polyester polycarbonate, a polyether polyol and an organic polyisocyanate. While these polyols are sometimes referred to in the singular as a polymer polyol, it must be remembered that the reaction product is actually a mixture of slightly different polymer polyols.

Any polyester polycarbonate may be expected to be useful in preparing the inventive polymer polyols. It is especially preferred that the polyester polycarbonates be prepared according to the method described in U.S. Pat. No. 4,267,120, incorporated by reference herein. Generally, such a preparation entails reacting a polyhydric compound, a cyclic organic acid anhydride and an alkylene carbonate in the presence of a basic catalyst. The alkylene carbonate may be made by reacting a 1,2-epoxide with carbon dioxide according to known methods.

Such polyester polycarbonates may be represented by the following structure:

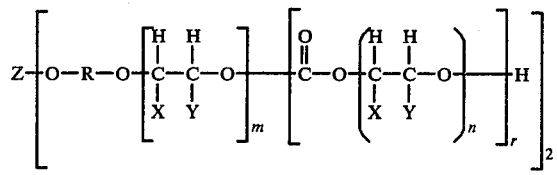

where X and Y, independently, are hydrogen, methyl or ethyl, m and n independently are integers of 1 to 5, R is a nucleus of a glycol selected from the group consisting of lower alkylene glycols and polyalkylene glycols of up to about 600 molecular weight, Z is an organic radical from a cyclic organic acid anhydride having 4 to 20 carbon atoms and r is an integer of from 1 to 5. The hydroxyl number of the polycarbonate should range between about 50 to about 500. The preferred molecular weight for the polycarbonates useful in this invention should range between about 250 to 1,000.

The polyether polyol which is used has a hydroxyl number preferably between about 20 and 60. The polyol is generally an alkylene oxide adduct of a polyhydric alcohol, preferably a trihydric alcohol, with a functionality of from about 2 to about 4. The alkylene oxide may suitably be ethylene oxide, propylene oxide, or 1,2-butylene oxide or a mixture of some or all of these. The polyol will preferably have a molecular weight within the range of from about 2,000 to about 10,000 and more preferably, from about 3,000 to about 8,000. The alkylene oxide is preferably propylene oxide or a mixture of propylene oxide and ethylene oxide. However, the alkylene oxide can also be a diepoxide, such as the diglycidyl ether of Bisphenol A. A number of suitable di- and even polyepoxides are listed in the specification to U.S. Pat. No. 4,316,991, incorporated by reference herein.

The polyisocyanate used herein may be any aromatic or aliphatic polyisocyanate. Typical aromatic polyisocyanates include m-phenylene diisocyanate, p-phenylene diisocyanate, polymethylene polyphenyl polyisocyanates, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

Preferably, the combined portion of polyester polycarbonate and organic polyisocyanate is about 10 to about 40 wt. % of the polyester polyol portion. This combined portion of polycarbonate and polyisocyanate is also known as the dispersed phase.

Since the polyester polymer polyol has by definition free hydroxyl groups, the amount of polyisocyanate used to form the polyester polymer polyol is less than the stoichiometric amount needed to satisfy the active hydrogens of the hydroxyl groups of the polyether polyol and the hydroxyl containing amine and the active amine hydrogens. Preferably, the polyisocyanate is added to the reaction mixture last. Therefore, the ratio of equivalents of polyester groups to equivalents of isocyanate groups should range from about 0.5 to 2.0. Preferably, the hydroxyl number range of these polyurethane polymer polyols should range from about 40 to about 75.

The polyether polyol, polyester polycarbonate and polyisocyanate can be successfully reacted without application of external heat and atmospheric pressure although higher temperatures and pressures would also be acceptable. The reaction temperature could range between 25° and 100° C.

The polyester polymer polyol prepared from the above ingredients is then incorporated into a formulation which results in a polyurethane product. The polyester polymer polyol may be used in conjunction with a polyisocyanate such as those mentioned above or may be combined with additional polyol, such as those mentioned above and others, and reacted with a polyisocyanate to form a resulting polyurethane foam product.

The advantage of the foam-forming method of my invention using the polyurethane polymer polyols described herein is that flexible urethane foams can be produced which are firmer and stronger than similar products made using conventional polyols. In other words, the load bearing properties of the foam is good. Also, foams made using the polyol polyols of this invention have better water absorption and retention properties and show lesser tendency to yellow than those made from prior art polyols and polymer polyols. The polyurethane polymer polyols of this invention may also be blended with conventional polyols to enhance the properties of the resulting foams beyond that possible with the conventional polyols alone.

In order to form the polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo[2.2.2.]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyaldehyde, cyclopentanone-1-carboxylate, acetylacetoneimine, bisacetylacetonealkylenediamines, salicylaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4'$, $Sn(OR)_4'$, $Al(OR)_3'$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polyester polymer polyol and any additional polyol present. The organic blowing agents optionally used along with the water are known in the art and are, for example, monofluorotrichloromethane, difluorodichloromethane, methylene dichloride and others generally known in the art.

Additives to regulate the cell size and the cell structure, for example, silicone oil such as dimethylpolysiloxanes may also be added to the foaming mixture. Fillers, flame retarding additives, dyes or plasticizers of known types may also be used. These and other additives are well known to those skilled in the art.

The invention and its improvement over the art will now be illustrated with the aid of the following examples. These examples are intended to illustrate the invention but are not intended to delineate the expected scope of the invention.

EXAMPLE 1

This example will illustrate the preparation of the polyester polymer polyols of this invention. Into a one-quart container were charged 300 g of a 3,500 molecular weight propylene oxide/ethylene oxide/diglycidyl ether of Bisphenol A adduct of glycerin, 56.25 g of a 225 hydroxyl number polyester polycarbonate (prepared by reaction of ethylene glycol, phthalic anhydride, and ethylene carbonate as described in U.S. Pat. No. 4,267,120) and 0.02 g of dibutyltin dilaurate. This mixture was then stirred 15 seconds on a drill press. Toluene diisocyanate (18.75 g) was then added and the mixture stirred 5 seconds. The reaction temperature increased from 23° to 28° C. within 2 minutes of mixing. The resultant product was a white, opaque, viscous liquid which had the following properties:

Hydroxyl number, mg KOH/g:45.2
Viscosity, 77° F., cps:2,420

EXAMPLE 2

This example will illustrate a scale up preparation of Example 1. Into a two-liter three-necked flask equipped with a stirrer, thermometer, nitrogen source and condenser were charged 1200 g of the 3,500 molecular weight propylene oxide/ethylene oxide/diglycidyl ether of Bisphenol A adduct of glycerin, 225 g of the polyester polycarbonate, and 0.08 g of dibutyltin dilaurate. Toluene diisocyanate (75 g) was then added over a five minute period. With no external heat applied the reaction exotherm peaked at 42° C. The reaction mixture was held at 40°–42° C. for a total of two hours. The resultant product was a white, opaque viscous liquid which had the following properties:

Hydroxyl number, mg KOH/g:42.9
Viscosity, 77° F., cps:4,240

EXAMPLE 3

This example will illustrate the use of the polymer polyol of this invention in the preparation of flexible foams. It will further show the improved load bearing properties (as measured by a Chatillon gauge) of foams made from this polymer polyol as compared to those from prior art polyols. The improved water retention properties of foams derived from the polyester polymer polyols will also be shown. Formulations, details of preparation and properties are as follows:

| Foam number | A | B | C |
|---|---|---|---|
| Formulation, pbw | | | |
| Polymer polyol of Example 2 | 100 | — | — |
| THANOL ® F-3550[1] | — | 100 | — |
| THANOL F-3520[2] | — | — | 100 |
| Water | 4.0 | 4.0 | 4.0 |
| L-6202 silicone[3] | 1.0 | 1.0 | 1.0 |
| 50% stannous octoate | 0.5 | 0.5 | 0.5 |
| THANCAT ® TD-33[4] | 0.3 | 0.3 | 0.3 |
| THANCAT DME[5] | 0.2 | — | — |
| Toluene diisocyanate | 47.6 | 48.4 | 48.4 |
| Isocyanate index | 1.05 | 1.05 | 1.05 |
| Details of Preparation | | | |
| Cream time, seconds | 14 | 12 | 12 |
| Rise time, seconds | 115 | 79 | 72 |
| Foam Properties | | | |
| Density, pcf | 1.67 | 1.61 | 1.59 |
| Chatillon gauge (33% indentation, lb) | 7.8 | 5.9 | 6.0 |
| Water Absorption Properties | | | |
| Water absorbed, g/g | 28.7 | 28.9 | 30.6 |
| Water retention, % | | | |

-continued

| Foam number | A | B | C |
| --- | --- | --- | --- |
| 45 minutes | 96 | 82.6 | 74.5 |
| 1.5 hours | 94.2 | 79.6 | 69.7 |
| 3.0 hours | 91.7 | 75.0 | 66.2 |
| 6.0 hours | 86.4 | 68.8 | 58.1 |
| 10.0 hours | 80.0 | 61.2 | 48.1 |
| 22.0 hours | 67.1 | 45.9 | 35.1 |

[1] 3,500 m.w. propylene oxide/ethylene oxide/diglycidyl ether Bisphenol A adduct of glycerin; Texaco Chemical Co.
[2] 3,500 m.w. propylene oxide/ethylene oxide adduct of glycerin; Texaco Chemical Co.
[3] Union Carbide Corp.
[4] 33% solution of triethylenediamine in propylene glycol.
[5] Dimethylaminoethanol; Texaco Chemical Co.

The water absorption of the foams was determined in the following manner:

A 2"×2"×1" piece of foam was squeezed in water three times and allowed to drain for one minute. The initial water pick up was calculated from the weight difference. Water retention was determined from the weight loss of the foam on standing at ambient conditions.

EXAMPLE 4

This example will further show the improved water absorption and retention properties of foams made from the polymer polyol of this invention as compared to those made from a hydrophilic polyol (THANOL F-4070) and a high reactivity polyol (THANOL SF-5505). It will further show that the water absorption of foams made from the polymer polyol is accomplished without volume swell of the foam.

Formulations, details of preparation, and properties are as follows:

| Foam number | A | D |
| --- | --- | --- |
| Formulation, pbw | | |
| Polymer polyol of Example 2 | 100 | — |
| THANOL F-4070[1] | — | 75 |
| THANOL SF-5505[2] | — | 25 |
| Water | 4.0 | 3.0 |
| L-6202 silicone | 1.0 | 1.0 |
| Fluorocarbon R-11b | — | 10 |
| THANCAT DME | 0.2 | 0.75 |
| 50% stannous octoate | 0.6 | 0.5 |
| THANCAT TD-33 | 0.3 | 0.3 |
| Toluene diisocyanate | 47.6 | 31.9 |
| Isocyanate index | 1.05 | 0.95 |
| Details of Preparation | | |
| Cream time, seconds | 14 | 8 |
| Rise time, seconds | 115 | 90 |
| Properties | | |
| Density, pcf | 1.67 | 2.07 |
| Water Absorption Properties | | |
| Water absorbed, g/g | 28.7 | 15.3 |
| Volume swell, % | Nil | 71.9 |
| Water Retention, % | | |
| 45 minutes | 96 | 83.4 |
| 1.5 hours | 94.2 | 76.2 |
| 3.0 hours | 91.7 | 69.1 |
| 8.0 hours | — | 45.5 |
| 12.0 hours | — | 31.4 |
| 22.0 hours | 67.1 | — |
| 24.0 hours | — | 16.1 |

[1] 34 hydroxyl number hydrophillic polyol triol; Texaco Chemical Co.
[2] 32 hydroxyl number high reactivity triol; Texaco Chemical Co., molecular weight, 5,500.

EXAMPLE 5

This example will show that flexible foams made from the polymer polyols of this invention do not yellow as rapidly as those made from prior art polyols when exposed to fluorescent lights. The foams were prepared as described in Example 2.

Foam yellowness (yellowness index) was measured using a Gardner Model XL-800 colorimeter according to ASTM D-1925. The colorimeter yellowness index was measured on freshly cut surfaces of foam. The foams were then exposed to laboratory fluorescent lights for one week and the yellowness index again determined. Results are shown in the following table.

| Foam number | A | B | C |
| --- | --- | --- | --- |
| Yellowness Index | | | |
| Original | 2.45 | 2.90 | 2.50 |
| One week | 19.44 | 35.06 | 35.15 |

EXAMPLE 6

This example will illustrate that flexible foams made from the polymer polyols of this invention do not yellow as rapidly as those made from prior art polymer polyols (Carbide's NIAX 34-27) when exposed to fluorescent lights.

The foam was prepared from the NIAX 34-27 using the following formulation. The yellowness index was determined as in Example 5.

| Foam number | E |
| --- | --- |
| Formulation, pbw | |
| NIAX 34-37 | 100 |
| Water | 4.0 |
| L-6202 silicone | 1.0 |
| 50% stannous octoate | 0.5 |
| THANCAT TD-33 | 0.3 |
| TDI | 46.8 |
| Isocyanate index | 1.05 |
| Details of Preparation | |
| Cream time, seconds | 12 |
| Rise time, seconds | 118 |
| Properties | |
| Density, pcf | 1.75 |
| Yellowness Index | |
| Original | 2.6 |
| One week | 31.7 |

By comparison a flexible foam made from the polymer polyol of this invention (Foam A) had a yellowness index of 19.44 after one week.

Many modifications may be made in the methods and polyester polymer polyols of this invention without departing from the spirit and scope thereof which is defined only in the appended claims. For example, one skilled in the art could probably devise a particular combination of components or method of reacting the polyester polycarbonate, polyisocyanate and polyether polyol to give a polymer polyol with particularly advantageous properties.

We claim:

1. A polyester polymer polyol made by the reaction of a polyester polycarbonate, a polyether polyol and an organic polyisocyanate wherein the combined portion of polyester polycarbonate and polyisocyanate is 10 to 40 wt. % of the polyether polyol portion, and the ratio of equivalents of polyester groups to equivalents of isocyanate groups ranges from 0.5 to 2.0.

2. The polyester polymer polyol of claim 1 wherein the polyether polyol has a molecular weight in the range of about 3,000 to 8,000.

3. The polyester polymer polyol of claim 1 wherein the polyester polycarbonate has a molecular weight in the range of about 250 to 1,000.

4. A method for producing a polyurethane which comprises first making a polyester polymer polyol by reacting a polyester polycarbonate, a polyether polyol and an organic polyisocyanate wherein the combined portion of polyester polycarbonate and polyisocyanate is 10 to 40 wt. % of the polyether polyol portion and the ratio of equivalents of polyester groups to equivalents of isocyanate groups ranges from 0.5 to 2.0 and then reacting said polyester polymer polyol with an organic polyisocyanate.

5. The method of claim 4 wherein the polyether polyol has a molecular weight in the range of about 3,000 to 8,000.

6. The method of claim 4 wherein the polyester polycarbonate has a molecular weight in the range of about 250 to 1,000.

* * * * *